(12) United States Patent
Sampath et al.

(10) Patent No.: US 8,451,740 B2
(45) Date of Patent: May 28, 2013

(54) COMPENSATING FOR DRIFTS OCCURRING DURING SLEEP TIMES IN ACCESS TERMINALS

(75) Inventors: Hemanth Sampath, San Diego, CA (US); Ravi Palanki, San Diego, CA (US); Jeremy H. Lin, San Diego, CA (US); Tamer A. Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 562 days.

(21) Appl. No.: 12/407,467

(22) Filed: Mar. 19, 2009

(65) Prior Publication Data

US 2009/0245230 A1   Oct. 1, 2009

Related U.S. Application Data

(60) Provisional application No. 61/041,324, filed on Apr. 1, 2008.

(51) Int. Cl.
*H04W 4/00* (2009.01)
(52) U.S. Cl.
USPC ............................ 370/252; 370/329; 370/341
(58) Field of Classification Search
None
See application file for complete search history.

(56) References Cited

U.S. PATENT DOCUMENTS

| | | | |
|---|---|---|---|
| 6,453,181 B1* | 9/2002 | Challa et al. | 455/574 |
| 6,735,454 B1* | 5/2004 | Yu et al. | 455/574 |
| 6,980,823 B2 | 12/2005 | Challa et al. | |
| 7,106,709 B2* | 9/2006 | Davidsson et al. | 370/330 |
| 7,542,728 B2* | 6/2009 | Bitran et al. | 455/73 |
| 7,680,071 B2* | 3/2010 | Bultan et al. | 370/311 |
| 2003/0014402 A1 | 1/2003 | Sealand et al. | |
| 2003/0043766 A1* | 3/2003 | McDonough et al. | 370/335 |
| 2003/0185326 A1* | 10/2003 | Kolze | 375/371 |
| 2007/0206524 A1* | 9/2007 | Suk | 370/320 |
| 2007/0206687 A1* | 9/2007 | Ananth et al. | 375/260 |

FOREIGN PATENT DOCUMENTS

| | | |
|---|---|---|
| EP | 1507333 | 2/2007 |
| JP | 2003110582 A | 4/2003 |
| JP | 2005516565 | 6/2005 |
| JP | 2008061134 A | 3/2008 |
| JP | 2008547277 | 12/2008 |
| WO | WO03065747 | 8/2003 |
| WO | WO2004045236 | 5/2004 |

OTHER PUBLICATIONS

International Search Report & Written Opinion—PCT/US2009/037898, International Search Authority—European Patent Office—Sep. 15, 2009.
Taiwan Search Report—TW098110196—TIPO—Jun. 14, 2006.

* cited by examiner

*Primary Examiner* — Chi Pham
*Assistant Examiner* — Soon-Dong D Hyun
(74) *Attorney, Agent, or Firm* — Abdollah Katbab

(57) ABSTRACT

A method and apparatus are presented for compensating drifts in access terminals occurring during a sleep time. The method includes determining whether a sleep time exceeds a threshold, buffering time domain samples containing acquisition pilots and a paging channel, powering down RF circuitry in the access terminal after buffering samples, processing the samples to compensate for drift, and determining whether the access terminal was paged based upon the processed samples. The apparatus includes a digital front end, an FFT engine coupled to the digital front end, a symbol buffer coupled to the FFT engine, a processor coupled to the digital front end, FFT engine, and symbol buffer, and a memory coupled to the processor, the memory further comprising instructions for executing the method.

47 Claims, 5 Drawing Sheets

COMPENSATING FOR DRIFTS OCCURRING DURING SLEEP TIMES IN ACCESS TERMINALS

CLAIM OF PRIORITY UNDER 35 U.S.C. §119

The present Application for Patent claims priority to Provisional Application No. 61/041,324 entitled "METHOD AND APPARATUS FOR HANDLING DRIFTS DURING SLEEP FOR ACCESS TERMINALS" filed Apr. 1, 2008, and assigned to the assignee hereof and hereby expressly incorporated by reference herein.

FIELD OF DISCLOSURE

Embodiments of the disclosure generally relate to communications in a wireless environment. More particularly, embodiments of the disclosure relate to compensating drifts of components within a wireless access terminal which occur during sleep times.

BACKGROUND

Wireless communication systems are widely deployed to provide various communication services such as voice, video, packet data, messaging, broadcast, etc. These wireless systems may be multiple-access systems capable of supporting multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3GPP LTE systems, Orthogonal FDMA (OFDMA) systems, Single-Carrier FDMA (SC-FDMA) systems, etc.

In wireless communication systems access terminals (referred to as mobile stations, handsets, mobile devices, and/or user terminals) receive signals from fixed position access points (also referred to as base stations, Node-B, cell sites or cells) that support communication links or service within particular geographic regions adjacent to or surrounding the access point. In order to aid in providing coverage, each cell may be sub-divided into multiple sectors, each corresponding to a smaller service area or geographic region. An array or series of access points placed adjacent to each other can form a communication system capable of servicing a number of system users, over a larger region.

Generally, a wireless multiple-access communication system can simultaneously support communication for multiple wireless access terminals. Each access terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out, multiple-in-signal-out or a multiple-in-multiple-out (MIMO) system.

Each access terminal can monitor a control channel that may be used to exchange messages between the access terminal and the access point. The control channel is used to transmit system/overhead messages, whereas traffic channels are typically used for substantive communication (e.g., voice and data) to and from the access terminal. For example, the control channel can be used to establish traffic channels, control power levels, and the like, as is known in the art.

Because the access terminals are typically battery operated, power conservation is emphasized in the system design. Accordingly, access terminals can enter into sleep modes and periodically awaken to monitor the control channel for messages/paging directed to the access terminal. During sleep modes, component(s) within the access terminal may experience drifts. These drifts may be characterized as uncontrolled variations in the performance of components in the Access Terminal. For example, an oscillator used as a frequency reference in the access terminal may provide a clock signal which experiences time and/or frequency variations. Component drift can adversely affect the functionality and/or performance of the access terminal. Moreover, this timing/frequency drift may also affect the performance of other users in the Uplink (UL) by violating the time/frequency orthogonality across users.

Accordingly, it is desirable to compensate for component drift in order to mitigate potentially adverse effects on the communication system.

SUMMARY

Exemplary embodiments are directed to systems and method for compensating for drifts occurring during sleep times in access terminals.

In one embodiment, a method for compensating drifts in access terminals occurring during a sleep time is presented. The method includes determining whether a sleep time exceeds a threshold, buffering time domain samples containing acquisition pilots and a paging channel, powering down RF circuitry in the access terminal after buffering samples, processing the samples to compensate for drift, and determining whether the access terminal was paged based upon the processed samples.

In another embodiment, an apparatus for compensating drifts in access terminals occurring during a sleep time is presented. The apparatus includes a digital front end, an FFT engine coupled to the digital front end, a symbol buffer coupled to the FFT engine, a processor coupled to the digital front end, FFT engine, and symbol buffer, and a memory coupled to the processor, the memory further comprising instructions which determines whether a sleep time exceeds a threshold, buffers time domain samples containing acquisition pilots and a paging channel, powers down RF circuitry in the access terminal after buffering samples, processes the samples to compensate for drift, and determines whether the access terminal was paged based upon the processed samples.

BRIEF DESCRIPTION OF THE DRAWINGS

The accompanying drawings are presented to aid in the description of embodiments of the disclosure and are provided solely for illustration of the embodiments and not limitation thereof.

DETAILED DESCRIPTION

Figure 1:
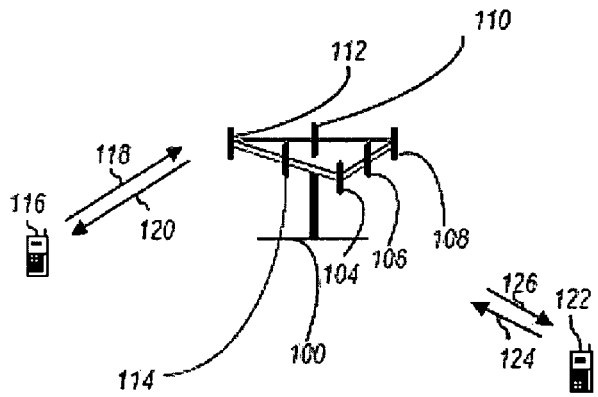
FIG. 1 shows a top level diagram of an exemplary multiple access wireless communications system.

Embodiments are disclosed in the following description and related drawings directed to specific embodiments of the disclosure. Alternate embodiments may be devised without departing from the scope of the invention. Additionally, well-known elements will not be described in detail or will be omitted so as not to obscure the relevant details of the disclosure.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below. Moreover, the procedures described herein may be used in FD-LTE and TD-LTE systems.

Single carrier frequency division multiple access (SC-FDMA), which utilizes single carrier modulation and frequency domain equalization, is a wireless technique which builds on OFDMA. SC-FDMA has similar performance and essentially the same overall complexity as an OFDMA system. However, an SC-FDMA signal has the advantage of a lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for the uplink multiple access scheme in 3GPP Long Term Evolution (LTE), or Evolved UTRA.

FIG. 1 shows a top level diagram of an exemplary multiple access wireless communications system. The system may be a MIMO system that can employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels may correspond to a dimension. The MIMO system can provide improved performance (e.g., higher throughput and/or greater reliability) if the additional dimensionalities created by the multiple transmit and receive antennas are utilized.

A wireless system may be a time division duplex (TDD) and/or a frequency division duplex (FDD) system. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Further referring to FIG. 1, an access point 100 (AP) may include multiple antenna groups, one including antennas 104 and 106, another including antennas 108 and 110, and an additional including antennas 112 and 114. In FIG. 1, only two antennas are shown for each antenna group, however, different numbers of antennas may be utilized for each antenna group. Access terminal 116 (AT) is in communication with antennas 112 and 114, where antennas 112 and 114 may transmit information to access terminal 116 over forward link 120, and receive information from access terminal 116 over reverse link 118. Access terminal 122 may be in communication with antennas 106 and 108, where antennas 106 and 108 transmit information to access terminal 122 over forward link 126, and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment shown in FIG. 1, each antenna group may be designed to communicate to access terminals in a designated sector within the areas covered by access point 100.

In communication over forward links 120 and 126, the transmitting antennas of access point 100 may utilize beamforming in order to improve the signal-to-noise ratio of forward links for the different access terminals 116 and 124. Using beamforming to transmit to access terminals scattered randomly throughout a coverage area may cause less interference to access terminals in neighboring cells than an access point transmitting through a single antenna to all its access terminals.

Figure 2:
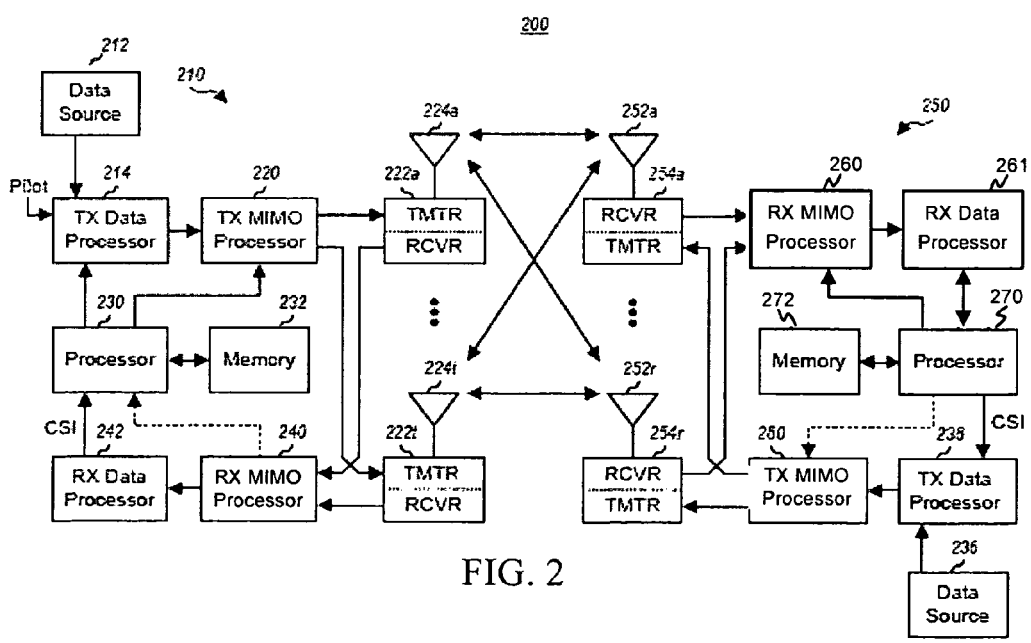
FIG. 2 shows block diagrams of an exemplary access terminal and access point within the wireless communications system.

FIG. 2 shows block diagrams of an exemplary access terminal 250 and access point 210 within the wireless communications system. In this embodiment, the communication system may be a MIMO system 200, which can include the Access Point 210 and the Access Terminal 250. Downlink (DL) transmission occurs from Access Point to the Access Terminal. Uplink (UL) transmission occurs from Access Terminal to the Access Point. At the access point 210, traffic data for a number of data streams may be provided from a data source 212 to a transmit (TX) data processor 214. Each data stream may be transmitted over a respective transmit antenna. TX data processor 214 may format, code, and interleave the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream may then modulated (i.e., symbol mapped) based on a particular modulation scheme (e.g., BPSK, QSPK, M-PSK, M-QAM, etc.) selected for that data stream to provide modulation symbols. The data rate, coding, and modulation for each data stream may be determined by instructions performed by processor 230.

The modulation symbols for all data streams may then be provided to a TX MIMO processor 220, which may further process the modulation symbols (e.g., for OFDM). TX MIMO processor 220 can then provide $N_T$ modulation symbol streams to $N_T$ transmitters (TMTR) 222a through 222t. In certain embodiments, TX MIMO processor 220 may apply beamforming weights to the symbols of the data streams and to the antenna from which the symbols are being transmitted. Each transmitter 222 may receive and processes a respective symbol stream to provide one or more analog signals, and further conditions (e.g., amplifies, filters, and/or up-converts) the analog signals to provide a modulated signal suitable for transmission over the MIMO channel. $N_T$ modulated signals from transmitters 222a through 222t may be then transmitted from $N_T$ antennas 224a through 224t, respectively.

At access terminal 250, the downlink (DL) signals from the Access Point may be received by $N_R$ antennas 252a through 252r and the received signal from each antenna 252 which may be provided to a respective receiver (RCVR) 254a through 254r. Each receiver 254 may condition (e.g., filters, amplifies, and down-converts) a respective received signal, digitize the conditioned signal to provide samples, and can further process the samples to provide a corresponding "received" symbol stream.

An RX MIMO processor 260 may then receive and processes the $N_R$ received symbol streams from $N_R$ receivers 254 based on a particular receiver processing technique to provide $N_T$ "detected" symbol streams. The RX data processor 261 may then demodulate, de-interleave, and decode each detected symbol stream to recover the traffic data for the data stream. The processing by RX MIMO processor 260 is complementary to that performed by TX MIMO processor 220. The processing by RX data processor is complementary to that performed by TX data processor 214 at access point 210.

Processor 270 may then formulate a reverse link message that may comprise various types of information regarding the communication link and/or the received data stream. The reverse link message may then be processed by a TX data processor 238, which also receives traffic data for a number of data streams from a data source 236, modulated by a Tx MIMO processor 280, conditioned by transmitters 254a through 254r, and transmitted back to transmitter system 210. At transmitter system 210, the modulated signals from receiver system 250 are received by antennas 224, conditioned by receivers 222, demodulated by a RX MIMO processor 240, and processed by a RX data processor 242 to extract the reserve link message transmitted by the receiver system 250.

Figure 3:
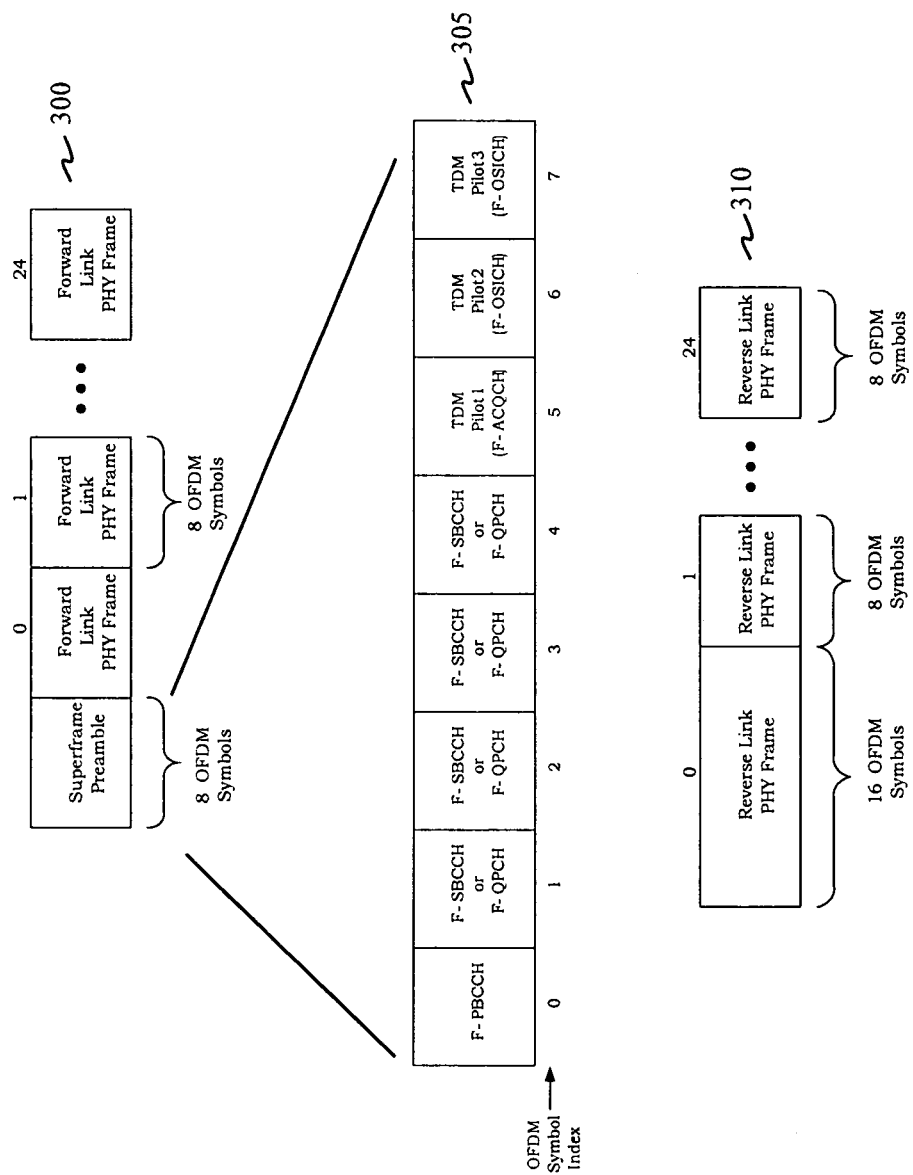
FIG. 3 depicts a diagram of a format associated with an exemplary super frame structure.

The transmission timeline for the forward and reverse links may be partitioned into units of superframes. FIG. 3 depicts a diagram of a format associated with an exemplary superframe 300 structure. Each superframe may span a particular time duration, which may be fixed or configurable. In the embodiment shown in FIG. 3, the superframe preamble may repeat approximately every 25 msec. On the forward link, a superframe 300 may include a preamble followed by M physical layer (PHY) frames, where M may be any integer value. On the reverse link, each superframe 310 may include M PHY frames, where the first PHY frame may be extended by the length of the superframe preamble on the forward link (for example, as shown in FIG. 3, frame 0 may include 16 OFDM symbols). In the design shown in FIG. 3, each superframe includes 25 PHY frames with indices of 0 through 24. Each PHY frame may carry traffic data, signaling, pilot, etc.

The superframe preamble 305 may include information to allow the access terminal 250 to perform paging and acquisition operations. Information for quick paging may be provided over a paging channel such as, for example, the Quick Page Channel (QPCH). Information for acquisition may reside in the Time Division Multiplexed (TDM) pilots 1, 2 and 3. In one embodiment, the superframe preamble may include eight OFDM symbols with indices of 0 through 7. The OFDM symbol 0 may comprises a Forward Primary Broadcast Control Channel (F-PBCCH) that carries information for deployment-specific parameters. OFDM symbols 1 through 4 may comprise either a Forward Secondary Broadcast Control Channel (F-SBCCH) or a Forward Quick Paging Channel (F-QPCH). The F-SBCCH may carry information for sector-specific parameters. The F-QPCH may carry information used for quick paging.

The OFDM symbols 5, 6 and 7 may comprise time division multiplexed (TDM) pilots 1, 2 and 3, respectively, which may be used by terminals for initial acquisition as described above. TDM pilot 1 may be used as a Forward Acquisition Channel (F-ACQCH). A Forward Other-Sector-Interference Channel (F-OSICH) may be sent in TDM pilots 2 and 3. One would appreciate that the superframe preamble may also be defined in other manners, and the paging may be performed using a variety of signals and channels, accordingly the format and channel structure provided above is merely exemplary.

For example, in Long Term Evolution (LTE) systems, the equivalents for TDM pilots 1 and TDM pilots 2 may be Primary and Secondary Synchronization Signals (PSS, SSS), respectively. In other embodiments, signals such as the Primary Pilot Channel (PPICH), or the LTE equivalent Common Reference Signal may be used in place of the synchronization signals for the search and/or pilot strength measurements.

Moreover, in another embodiment, the paging may be performed using a data channel such as, for example, the Primary Data Shared Channel (PDSCH).

In one embodiment, with respect to quick paging operations, when the access terminal sleeps, it should wake up periodically to read the QPCH. If the QPCH decode is successful (that is, the message successfully passes a CRC test) and the terminal is paged, it should decode the Full-Page Channel to determine the paging details. The Full-Page channel may be transmitted on regular PHY Frames using Hybrid ARQ (HARQ). The transmission may span 6 Frames, that are separated by approximately ~5 msec apart. A terminal with good SNR may decode the Full Page in 1 Frame, whereas a terminal with poor SNR can take up to 6 Frames to decode Full Page. Hence, the total decode times for Full Page can be as high as approximately 30 msec. In general, decoding Full Page channel consumes excess power and wastes battery life. It is for this reason that the QPCH channel was introduced, that is, in order to limit the number of times the access terminal 250 has to decode the Full Page, and thus enhance battery life.

In order to decode any received channel upon being initialized after power-up, the access terminal 250 should first perform acquisition. When the access terminal 250 is initially powered up, it should determine the timing and frequency offset of the Access Terminal with respect to the Access Point in order to enable successful decoding of the DL channels. To determine these offsets, the access terminal performs what is defined herein as "acquisition." The acquisition procedure can lock on to the TDM-1, 2, 3 pilot symbols, and thereby establishes correct timing and frequency offsets. In other words, after acquisition, the access terminal is capable of decoding other channels such as, for example, the QPCH channel, the DCH (data channel) etc.

In one embodiment, the superframe preamble may include eight OFDM symbols with indices of 0 through 7. The OFDM symbol 0 may comprises a Forward Primary Broadcast Control Channel (F-PBCCH) that carries information for deployment-specific parameters. OFDM symbols 1 through 4 may comprise either a Forward Secondary Broadcast Control Channel (F-SBCCH) or a Forward Quick Paging Channel (F-QPCH). The F-SBCCH may carry information for sector-specific parameters. The F-QPCH may carry information used for quick paging described above.

Figure 4:
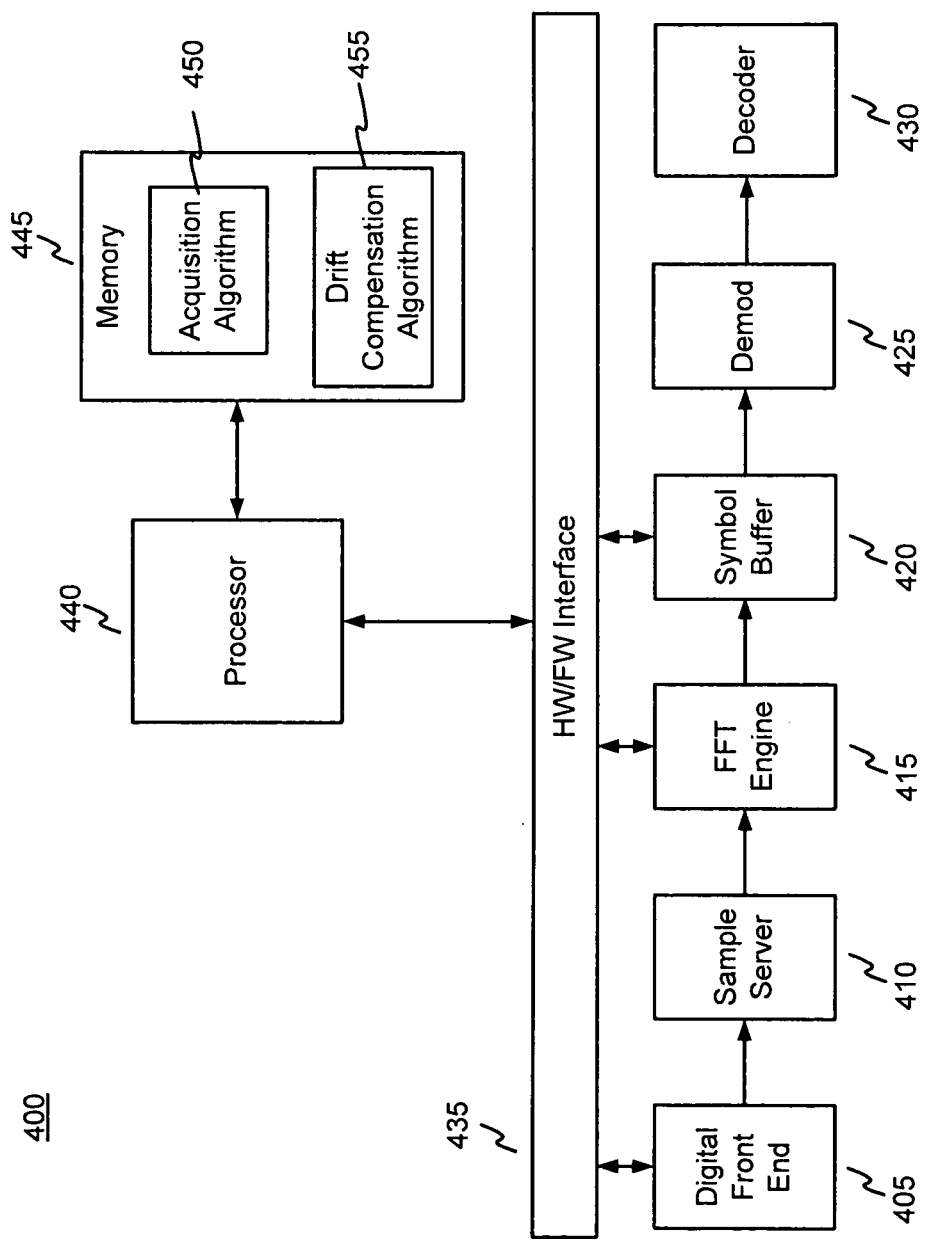
FIG. 4 shows a block diagram of an exemplary hardware receiver architecture associated with an access terminal.

FIG. 4 shows a block diagram of an exemplary hardware architecture for a receiver 400 associated with an access terminal. The receiver may be comprised of a series of signal processing functional blocks, including Front End 405, Sample Server 410, FFT Engine 415, Symbol Buffer 420, Demodulator 425, and Decoder 430. The signal processing blocks may be controlled by a processor 440, which interfaces to the signal processing block over a Hardware/Firmware (HW/FW) interface 435. The processor 440, which may be at least one micro-processor, a micro-controller, a Digital Signal Processor (DSP), etc., or any combination thereof, may include onboard and/or external memory 445 which stores program code and any associated parameters and data. The program code may be realized in the form of software, firmware, or any combination thereof.

The received baseband I & Q signal time domain samples, obtained by digitizing the received signal via an Analog-to-Digital Converter (ADC), may be fed to the Digital Front End Block 405. The Digital Front End block performs signal conditioning such as digital AGC and filtering. Note that a modem typically also has an analog Front End Block that is part of the RF circuitry (not shown). The RF circuitry includes analog components like analog AGC, mixer, analog filters etc and operate on the receive signal before it is fed to the ADC.

The time domain samples may be passed on to the sample server 410 where they are buffered prior be converted into the frequency domain. The time domain samples may be converted to frequency domain symbols by using an FFT Engine 415. The symbols may then be buffered in Symbol Buffer 420. The symbols may be demodulated into soft information bits by demodulator 425, and subsequently decoded in decoder 430. The demodulator 425 may have a MIMO receiver such as an MMSE receiver, followed by a Log Likelihood Ratio (LLR) computing engine. The decoder 430 may include a Viterbi decoder, a Turbo decoder and/or a LDPC decoder.

As mentioned previously, the access terminal's sleep time may be increased during periods of terminal inactivity in order to save battery life. However, significant time and/or frequency drift can arise due to the sleep clock drifting. As an example, 2 ppm sleep clock drift in a 20 MHz system can lead to a timing drift of ~20 us, over a 10 sec sleep duration. In one embodiment such as in the LTE or UMB or 802.20 standards, an OFDM symbol can be ~100 us long, in which case the timing drift is approximately 1/5 of an OFDM symbol period. In another embodiments, such as 802.11 WLAN standards, an OFDM symbol can be 4 us long, in which case the timing drift can span approximately 5 OFDM symbols. Furthermore, using lower cost crystal oscillators (XO) that may have a higher drift specification in ppm (e.g.,: 50-100 ppm) may result in much larger time/frequency drifts over this timescale. Due to such time and/or frequency drifts, the access terminal may not be able to decode a paging channel (e.g., QPCH) upon wake-up, since typically the QPCH channel has a higher spectral efficiency and may be susceptible to distortion introduced by time/frequency drifts. As a result, the access terminal does not know whether it is being paged or not. This leads to the terminal attempting to decode the Full Page channel, causing it to be awake for up to 30 msec, as explained above. Typically, the terminal is better positioned to decode the Full Page Channel even in the presence of timing/frequency drift since the information is encoded across 6 Frames spread over 30 msec, leading to a very small spectral efficiency (smaller than the spectral efficiency of QPCH channel). However, if the time drift is significant fraction of the OFDM symbol (say >25%) , or if the frequency drift is a significant fraction of the OFDM tone-spacing (say 25%), then it is highly likely that the Full Page decode might fail. This leads to the terminal re-running acquisition after some time-out period to obtain a fresh time/frequency offset, and then employing them to decode a full-page.

All the above activities can lead to expending significant battery power and reducing the standby time. To mitigate this effect, conventional access terminals might reduce sleep times to shorten clock drifting, which again impacts efficiency. Alternately, access terminals may employ a more expensive LO that experiences a smaller ppm sleep drift, which increases terminal cost.

Embodiments of the disclosure improve the standby time by compensating for the time and/or frequency drift of the sleep clock, with minimal power consumption. This compensation may be performed as follows. When sleep times are sufficiently long and exceed a predetermined period of time, the access terminal may awaken early to buffer samples that also contain the superframe preamble, at some unknown time-offset in the buffered samples. For example, if the terminal is using a 5 ppm clock and sleeps for 10 seconds, it may wake up ~50 us earlier to buffer samples, assuming that the worse-case clock drift of ~50 us. Since the actual ppm offset may be smaller than 5 ppm at any given time instant, the buffered samples will in reality contain the superframe preamble at some unknown offset of up to 50 us. The buffered samples, specifically the TDM pilots, are then analyzed and processed in order to determine any time and/or frequency offsets values. The buffered samples may then be corrected for the time/frequency offset values prior to performing a quick paging operation.

This buffering may be performed by the processor 440 executing acquisition algorithm 450, by storing the samples in the Tightly Coupled Memory (TCM) of the processor. Alternately, the processor may control the FFT engine 415 and place it in a by-pass mode so that time domain samples can be buffered in the symbol buffer 420. The drift compensation algorithm 455 may compute correction factors from the drift offset values derived the buffered samples, and apply the values to the buffered samples to compensate for the drift. Details of the acquisition and drift compensation algorithms are presented below in the description of FIGS. 5 and 6.

Figure 5:
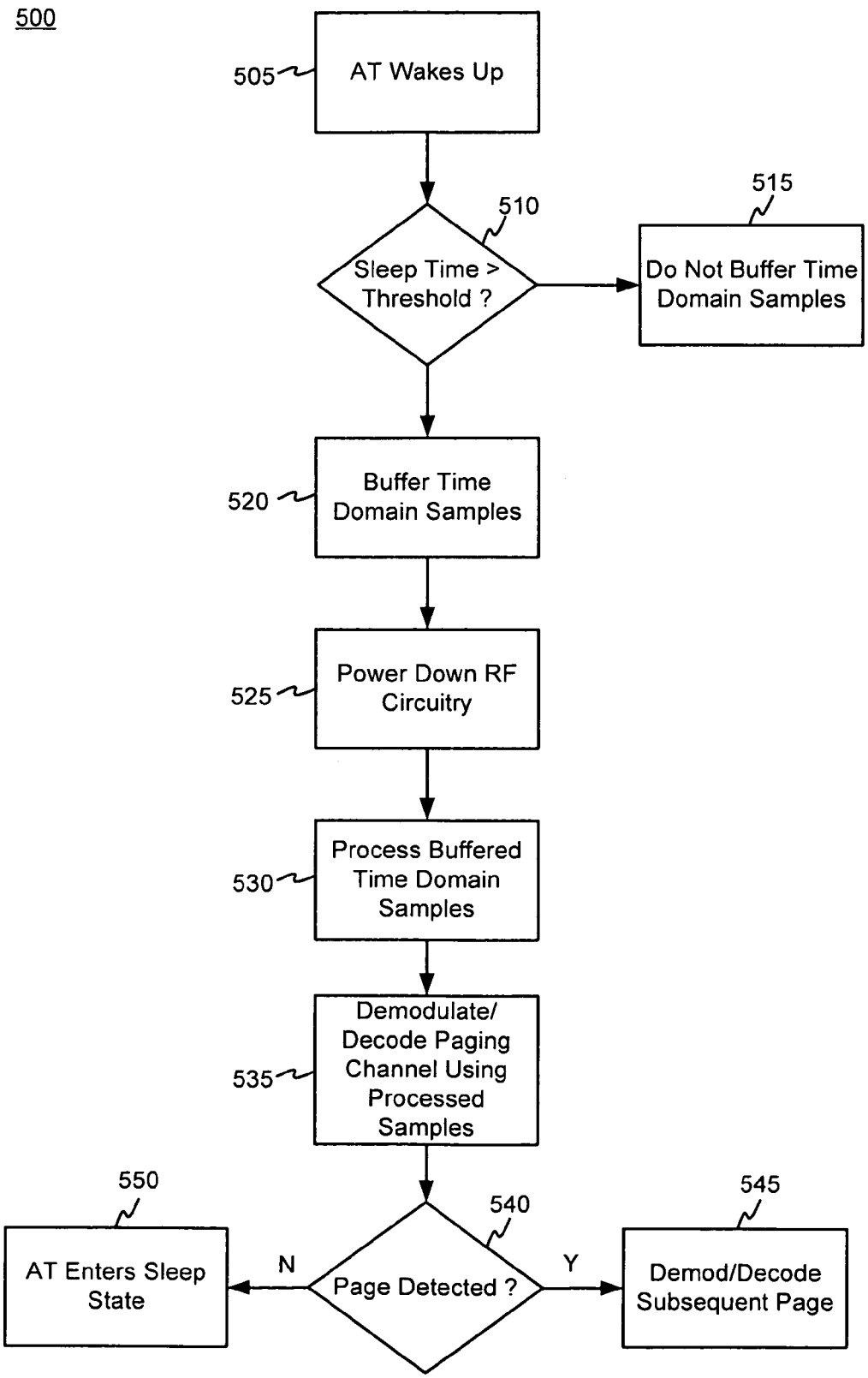
FIG. 5 shows a flow diagram of an exemplary process for acquiring time domain samples and compensating drift within an access terminal.

FIG. 5 shows a flow diagram of an exemplary process 500 for acquiring time domain samples and compensating drift within an access terminal 250.

After going to sleep, the access terminal 250 may wake up at time duration=Sleep Cycle–deltaT, where deltaT is the sleep-drift. In one example, assuming a 5 ppm maximum clock drift and 10 sec sleep duration, deltaT can be 50 us. The processor can then buffer the time domain samples upon wakeup (Block 520). In some embodiments, the time-domains samples may be part of the superframe preamble.

The storage location of the time domain samples can accomplished using a variety of different memory locations available in the access terminal 250, such as, for example, a symbol-RAM in the symbol buffer 420, a Tightly Coupled Memory (TCM) memory of the process, etc. The processor 440 may determine where the symbols are buffered by controlling any of the appropriate signal processing blocks via the HW/FW interface 435. For example, in one embodiment, the processor 440 may place the FFT engine 415 in a bypass mode (in order to avoid transforming the acquired samples into the frequency domain) to move samples from sample-server 410 to symbol RAM or TCM for buffering.

After buffering the time domain samples, the processor 440 may power down the RF circuitry to save power (Block 525). The processor may then begin pure digital processing of superframe preamble to determine and correct drift (Block 530). The details of this processing are presented in FIG. 6.

Next, the access terminal 250 may perform regular demodulation processing of the paging channel using the corrected buffered time domain samples to determine if the access terminal 250 has been paged (Block 535). If the paging channel decode results in a successful CRC and the access terminal 250 detects a page (Block 540), then it may proceed to decode the full page of the next superframe (Block 545). Otherwise, if the paging channel decode results in a successful CRC and a page is not detected in Block 540, the access terminal 250 may reenter the sleep state (Block 550).

The processor 440 in access terminal 250 may also choose to do some or all parts of paging channel demodulation and time/frequency correction offline in firmware (FW), depending upon its hardware capability. For decoding a full-page channel, the terminal can use the already computed time/frequency offset to wake up at the correct time, and also apply the correct frequency offset to the phase lock loop (PLL), digital frequency correction block or the Voltage Controlled Temperature Compensated Crystal Oscillator (VCTCXO).

Accordingly, the wakeup time according to the above-described method shown in FIG. 5 is significantly smaller than conventional wakeup processes, thereby leading to a substantial increase in standby time. This approach also improves the performance of the paging channel demodulation and decoding, in the presence of timing/frequency drifts, thereby leading to a lower probability of reading subsequent pages, such as, for example, full-pages and/or full-page failures, thus conserving battery power.

Note that if the sleep-drift (deltaT) is less than some Threshold (e.g., less than $1/20^{th}$ of the OFDM symbol duration), then the Access Terminal may choose to wake up at time duration=Sleep Cycle, and proceed with a regular demodulation of the paging channel to determine if it was paged. In other words, all the above process for time/frequency offset estimation and correction, including buffering of time domain samples may be skipped. This is done to further reduce power consumption.

Figure 6:
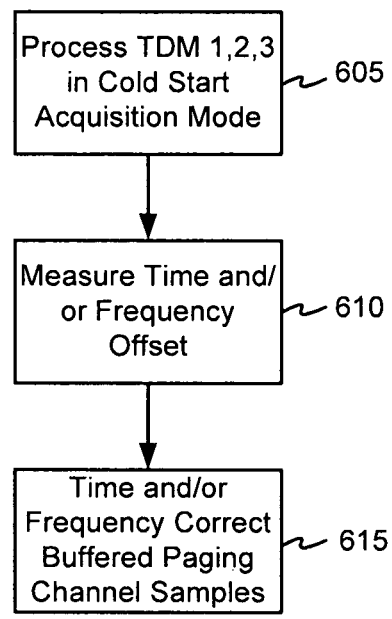
FIG. 6 shows a flow diagram of an exemplary process for correcting time and/or frequency drifts within the compensation process shown in FIG. 5.

FIG. 6 shows a flow diagram of an exemplary process for correcting time and/or frequency drifts within the compensation process 530 shown in FIG. 5.

After buffering the samples in Block 520 shown in FIG. 5, the processor 440 may direct access terminal 250 to first processes TDM-1,2,3 pilot samples in a cold-start acquisition mode in order to compute the time and/or frequency offset(s) of the clock (Blocks 605 and 610). Next, the processor 440 may compensate for the offset(s) by applying a time and/or frequency correction on the buffered samples corresponding to the paging channel (Block 615). The time correction may be applied by changing the starting location of the 1st OFDM symbol of paging channel, according to the temporal offset detected. The frequency correction may be applied by using a time-domain phase ramp corresponding to the estimated frequency offset. For example, if the frequency offset is denoted as "f", the phase ramp is given as $theta(t)=exp(j*2*\pi*f*t)$, where $j=sqrt(-1)$, and t is the time. This phase ramp is point-wise multiplied by the received samples to obtain a frequency corrected received samples.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Accordingly, an embodiment of the invention can include a computer readable media embodying a method for compensating drifts occurring during sleep times in access terminals. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for compensating drifts occurring during a sleep time in an access terminal, comprising:
    determining whether a sleep time exceeds a threshold, and when the sleep time exceeds the threshold:
        buffering time domain samples from at least one acquisition or paging channel,
        powering down RF circuitry in the access terminal after buffering the time domain samples, and
        processing the time domain samples to compensate for drift; and
    determining whether the access terminal was paged based upon the processed time domain samples.

2. The method according to claim 1, wherein the time domain samples further comprise acquisition pilots.

3. The method according to claim 2, wherein the paging channel comprises the Quick Paging CHannel (QPCH).

4. The method according to claim 2, wherein determining whether the access terminal was paged further comprises:
    demodulating the paging channel; and
    determining the terminal was paged based upon the successfully decoding the paging channel.

5. The method according to claim 4, further comprising:
    decoding a subsequent page when the page based upon the paging channel is detected.

6. The method according to claim 2, wherein the processing further comprises:
    processing TDM 1, 2, 3 samples in a cold start acquisition mode;
    determining at least one of time and frequency offset correction values; and
    applying the at least one time and frequency offset correction values to the buffered paging channel samples.

7. The method according to claim 6, further comprising:
    applying the time correction by determining the starting location of the first OFDM symbol of the paging channel.

8. The method according to claim 6, further comprising:
    applying the frequency correction using a time-domain phase ramp corresponding to the determined frequency offset correction value.

9. The method according to claim 1, wherein the time domain samples are buffered in a buffer space which includes at least one of a symbol-RAM, a TCM memory in the processor, and a sample-server.

10. The method according to claim 9, further comprising:
    operating an FFT engine in a bypass mode to transfer the time domain samples from the sample server to the symbol-RAM.

11. The method according to claim 2, when it is determined that the sleep time did not exceed the threshold, further comprising:
    demodulating the paging channel without buffering and processing of the time domain samples.

12. The method according to claim 11, further comprising;
    placing the AT in a sleep state upon detecting that the terminal was not paged after demodulating the paging channel.

13. An apparatus for compensating drifts occurring during a sleep time in an access terminal, comprising:
    a digital front end;
    an FFT engine coupled to the digital front end;
    a symbol buffer coupled to the FFT engine;
    a processor coupled to the digital front end, FFT engine, and the symbol buffer;
    a memory coupled to the processor, the memory further comprising instructions which
        determines whether a sleep time exceeds a threshold, and when the sleep time exceeds the threshold: buffers time domain samples from at least one acquisition or paging channel, powers down RF circuitry in the access terminal after buffering the time domain samples, and processes the time domain samples to compensate for drift, and
        determines whether the access terminal was paged based upon the processed time domain samples.

14. The apparatus according to claim 13, wherein the time domain samples further comprise acquisition pilots.

15. The apparatus according to claim 14, wherein the instructions which determine whether the access terminal was paged comprise further instruction which:
    demodulates the paging channel; and
    determines whether the terminal was paged based upon the successful demodulating of the paging channel.

16. The apparatus according to claim 15, wherein the memory comprises further instructions which
    demodulate a subsequent page when the page based upon the paging channel is detected.

17. The apparatus according to claim 16, wherein the memory comprises further instructions which
    process TDM 1, 2, 3 samples in a cold start acquisition mode,
    determines at least one of time and frequency offset correction values, and applies the at least one time and frequency offset correction values to the buffered paging channel samples.

18. The apparatus according to claim 17, wherein the memory comprises further instructions which
applies the time correction by determining the starting location of the first OFDM symbol of the paging channel.

19. The apparatus according to claim 17, wherein the memory comprises further instructions which
applies the frequency correction using a time-domain phase ramp corresponding to the determined frequency offset correction value.

20. An apparatus for compensating drifts occurring during a sleep time in an access terminal, comprising:
means for determining whether a sleep time exceeds a threshold, and when the sleep time exceeds the threshold:
means for buffering time domain samples from at least one acquisition or paging channel,
means for powering down RF circuitry in the access terminal after buffering the time domain samples, and
means for processing the time domain samples to compensate for drift; and
means for determining whether the access terminal was paged based upon the processed time domain samples.

21. The apparatus according to claim 20, wherein the time domain samples further comprise acquisition pilots.

22. The apparatus according to claim 21, wherein the paging channel comprises the Quick Paging CHannel (QPCH).

23. The apparatus according to claim 21, further comprising:
means for demodulating the paging channel; and
means for determining whether the terminal was paged based upon the successful decoding of the paging channel.

24. The apparatus according to claim 23, further comprising:
means for demodulating a subsequent page when the page based upon the paging channel is detected.

25. The apparatus according to claim 22, further comprising:
means for processing TDM 1, 2, 3 samples in a cold start acquisition mode;
means for determining at least one of time and frequency offset correction values; and
means for applying the at least one time and frequency offset correction values to the buffered paging channel samples.

26. A non-transitory computer readable media embodying logic for compensating drifts occurring during a sleep time in an access terminal, the logic configured to perform a method comprising:
determining whether a sleep time exceeds a threshold, and when the sleep time exceeds the threshold,
buffering time domain samples from at least one acquisition or paging channel,
powering down RF circuitry in the access terminal after buffering the time domain samples, and
processing the time domain samples to compensate for drift; and
determining whether the access terminal was paged based upon the processed time domain samples.

27. The non-transitory computer readable media according to claim 26, wherein the time domain samples further comprise acquisition pilots.

28. The non-transitory computer readable media according to claim 27, wherein the paging channel comprises the Quick Paging CHannel (QPCH).

29. The non-transitory computer readable media according to claim 27, comprising additional logic to perform the method further comprising:
demodulating the paging channel; and
determining whether the terminal was paged based upon the successful demodulating of the paging channel.

30. The non-transitory computer readable media according to claim 29, comprising additional logic to perform the method further comprising:
demodulating a subsequent page when the page based upon the paging channel is detected.

31. The non-transitory computer readable media according to claim 28, comprising additional logic to perform the method further comprising:
processing TDM 1, 2, 3 samples in a cold start acquisition mode;
determining at least one of time and frequency offset correction values; and
applying the at least one time and frequency offset correction values to the buffered paging channel samples.

32. A method for compensating drifts occurring during a sleep time in an access terminal, comprising:
determining that a sleep time exceeds a threshold, and when the sleep time exceeds the threshold:
buffering time domain samples containing acquisition pilots and a paging channel; and
processing the time domain samples to compensate for drift.

33. The method according to claim 32, further comprising:
powering down RF circuitry in the access terminal after buffering the time domain samples.

34. The method according to claim 32, further comprising:
determining whether the access terminal was paged based upon the time domain processed samples.

35. A method for compensating drifts occurring during a sleep time in an access terminal, comprising:
determining that a sleep time exceeds a threshold;
buffering time domain samples containing acquisition pilots and a paging channel:
processing the time domain samples to compensate for drift;
processing Primary and Secondary Synchronization Signal (PSS and SSS) samples in a cold start acquisition mode;
determining at least one of time and frequency offset correction values; and
applying the at least one time and frequency offset correction values to the buffered paging samples.

36. The method according to claim 34, wherein the page is sent on a data channel.

37. An apparatus for compensating drifts occurring during a sleep time in an access terminal, comprising:
means for determining that a sleep time exceeds a threshold, and when the sleep time exceeds the threshold:
means for buffering time domain samples containing acquisition pilots and a paging channel; and
means for processing the time domain samples to compensate for drift.

38. The apparatus according to claim 37, further comprising:
means for powering down RF circuitry in the access terminal after buffering the time domain samples.

39. The apparatus according to claim 37, further comprising:

means for determining whether the access terminal was paged based upon the processed time domain samples.

40. An apparatus for compensating drifts occurring during a sleep time in an access terminal, comprising:
means for determining that a sleep time exceeds a threshold;
means for buffering time domain samples containing acquisition pilots and a paging channel;
means for processing the time domain samples to compensate for drift;
means for processing Primary and Secondary Synchronization Signal (PSS and SSS) samples in a cold start acquisition mode;
means for determining at least one of time and frequency offset correction values; and
means for applying the at least one time and frequency offset correction values to the buffered paging samples.

41. The apparatus according to claim 39, wherein the page is sent on a data channel.

42. An apparatus for compensating drifts occurring during a sleep time in an access terminal, comprising:
a digital front end;
an FFT engine coupled to the digital front end;
a symbol buffer coupled to the FFT engine;
a processor coupled to the digital front end, FFT engine, and the symbol buffer;
a memory coupled to the processor, the memory further comprising instructions which
determines that a sleep time exceeds a threshold, and when the sleep time exceeds the threshold:
buffers time domain samples containing acquisition pilots and a paging channel, and
processes the time domain samples to compensate for drift.

43. The apparatus according to claim 42, wherein the memory further comprising instructions which:
power down RF circuitry in the access terminal after buffering the time domain samples.

44. The apparatus according to claim 42, wherein the memory further comprising instructions which:
determine whether the access terminal was paged based upon the processed time domain samples.

45. An apparatus for compensating drifts occurring during a sleep time in an access terminal, comprising:
a digital front end;
an FFT engine coupled to the digital front end;
a symbol buffer coupled to the FFT engine;
a processor coupled to the digital front end, FFT engine, and the symbol buffer; and
a memory coupled to the processor, the memory further comprising instructions which
determines that a sleep time exceeds a threshold,
buffers time domain samples containing acquisition pilots and a paging channel,
processes the time domain samples to compensate for drift,
process Primary and Secondary Synchronization Signal (PSS and SSS) samples in a cold start acquisition mode,
determine at least one of time and frequency offset correction values, and
apply the at least one time and frequency offset correction values to the buffered paging samples.

46. The apparatus according to claim 44, wherein the page is sent on a data channel.

47. A non-transitory computer readable media embodying logic for compensating drifts occurring during a sleep time in an access terminal, the logic configured to perform a method comprising:
determining that a sleep time exceeds a threshold, and when the sleep time exceeds the threshold:
buffering time domain samples containing acquisition pilots and a paging channel; and
processing the time domain samples to compensate for drift.

* * * * *